(12) United States Patent
Choon et al.

(10) Patent No.: US 9,985,338 B2
(45) Date of Patent: May 29, 2018

(54) MOBILE TERMINAL (71) Applicants: Tan Yew Choon, Singapore (SG); Ng Guan Hong, Singapore (SG); Tay Yew Siow, Singapore (SG)

(72) Inventors: Tan Yew Choon, Singapore (SG); Ng Guan Hong, Singapore (SG); Tay Yew Siow, Singapore (SG)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 22 days.

(21) Appl. No.: 15/416,747

(22) Filed: Jan. 26, 2017

(65) Prior Publication Data
US 2018/0083343 A1    Mar. 22, 2018

(30) Foreign Application Priority Data
Sep. 22, 2016 (CN) .......................... 2016 1 0840545

(51) Int. Cl.
*H01Q 1/24* (2006.01)
*H04M 1/02* (2006.01)
*H01Q 1/48* (2006.01)

(52) U.S. Cl.
CPC .............. *H01Q 1/243* (2013.01); *H01Q 1/48* (2013.01); *H04M 1/026* (2013.01)

(58) Field of Classification Search
CPC ......................... H01Q 1/24; H01Q 1/48–1/50
USPC ........................................................ 343/702
See application file for complete search history.

(56) References Cited

U.S. PATENT DOCUMENTS

| 9,853,348 | B2* | 12/2017 | Lee | H01Q 1/243 |
| 9,871,286 | B2* | 1/2018 | Kang | H01Q 1/243 |
| 2012/0176279 | A1* | 7/2012 | Merz | H01Q 1/243 343/702 |
| 2015/0123871 | A1* | 5/2015 | Chang | H01Q 1/243 343/872 |
| 2016/0322700 | A1* | 11/2016 | Choon | H01Q 1/243 |

* cited by examiner

*Primary Examiner* — Dameon E Levi
*Assistant Examiner* — Hasan Islam
(74) *Attorney, Agent, or Firm* — Na Xu; IPro, PLLC (57) ABSTRACT A mobile terminal, including metal back cover including metal cover plate, first and second metal frames respectively arranged at two opposite sides thereof for forming first gap, first metal frame comprising first, second and third radiating portions; antenna module fixed on metal back cover close to first metal frame, antenna module comprising system ground connected with metal cover plate, and antenna circuit board connected with system ground and first metal frame, antenna circuit board including grounding, feeding, matching circuit and tuner; grounding circuit comprises grounding point and grounding pin and going across first gap; the feeding circuit comprises feeding point and feeding pin and going across first gap; first, second and third radiating portions are configured that when tuning in middle-high frequency, first and second radiating portions serve as radiator of antenna module, and when tuning in low frequency, second and third radiating portions serve as radiator.

10 Claims, 7 Drawing Sheets

MOBILE TERMINAL

TECHNICAL FIELD

The present disclosure relates to the field of mobile communication and, in particular, to a mobile terminal.

BACKGROUND

With the development of wireless communication technologies, mobile terminals such as cellphone, tablet PC, portable multi-media player and the like are widely applied in people's life. A mobile terminal device is usually configured with an antenna module in its interior for transmitting and receiving wireless signals, so as to support wireless communication function of the terminal device.

With the development of mobile communication technologies, mobile terminals need to cover more and more modes and be compatible with multiple frequency bands (bandwidths), including GSM/DCS/PCS/WCDMA/TD-SCDMA/LTE and so on. At present, smart phones are more likely to adopt metal casing, for example, metal back cover or metal frame. However, metal casing may shield or absorb electromagnetic wave to a certain extent, resulting in that the antenna cannot tune flexibly, which narrows the frequency band of the antenna, and makes it difficult to cover multiple frequency bands, in particular the frequency band within the range of 700-2690 MHz.

In the related art, the antenna of the mobile terminal needs to be arranged outside the mobile terminal, or a special design is required so that the antenna will not be surrounded by the metal casing. However, such manner will, in one aspect, limit the radiation space of the antenna thereby limiting the frequency band and, in another aspect, affect the overall appearance of the mobile terminal.

Therefore, it is necessary to provide an improved mobile terminal so as to solve the above technical problems.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present invention will be further illustrated with reference to the accompanying drawings and the embodiments.

Figure 1:
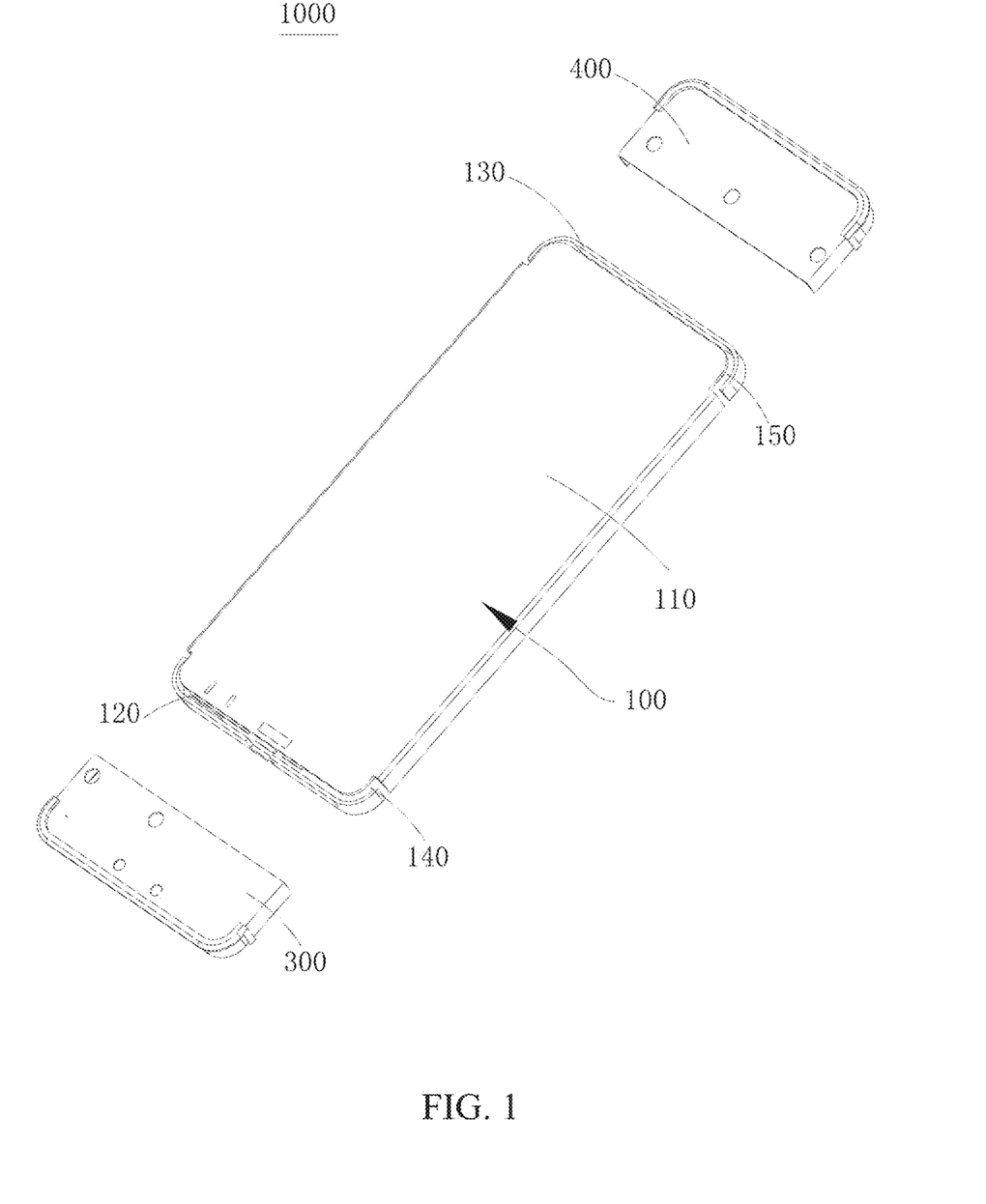
FIG. 1 is a structural schematic diagram of a mobile terminal in accordance with an exemplary embodiment of the present disclosure, from a first aspect.
Figure 2:
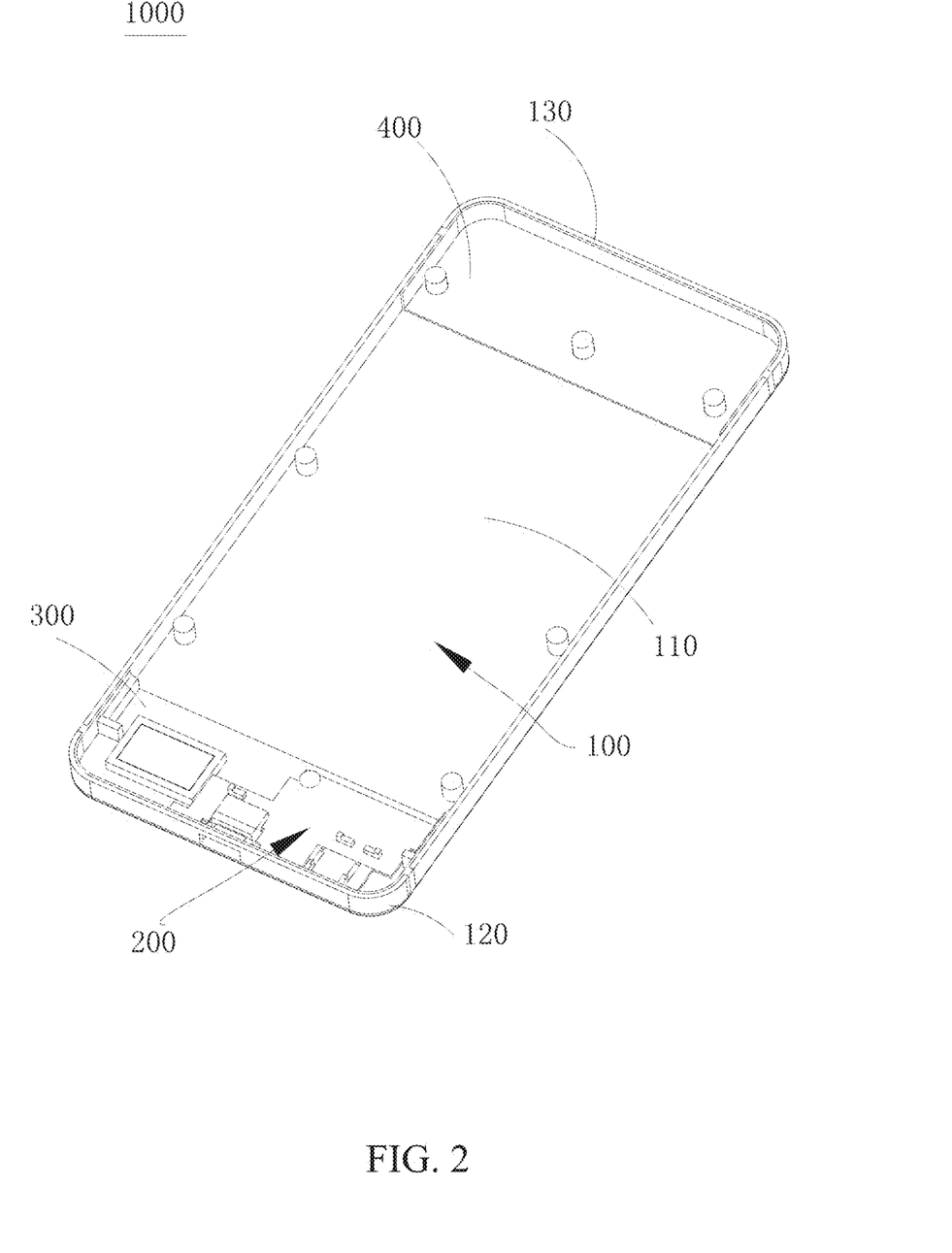
FIG. 2 is a structural schematic diagram of the mobile terminal in FIG. 1 from another aspect, and be kindly noted that a system ground thereof has been removed.

FIGS. 1-4 generally show a basic structure of the mobile terminal according to an embodiment of the present disclosure. As shown in FIGS. 1-2, the mobile terminal 1000 generally includes a metal back cover 100 having an accommodating space and an antenna module 200 accommodated in the accommodating space of the metal back cover 100.

In the present embodiment, the metal back cover 100 is an all-metal back cover, which generally includes a metal cover plate 110, and a first metal frame 120 and a second metal frame 130 which are respectively arranged at and keeps a distance from two opposite sides of the metal cover plate 110. The first metal frame 120 serves as a radiator of the antenna module 200. The antenna module 200 is fixed on a side of the metal cover plate 110 close to the first metal frame 120, and is electrically connected with the metal cover plate 110 and the first metal frame 120, respectively.

Figure 4:
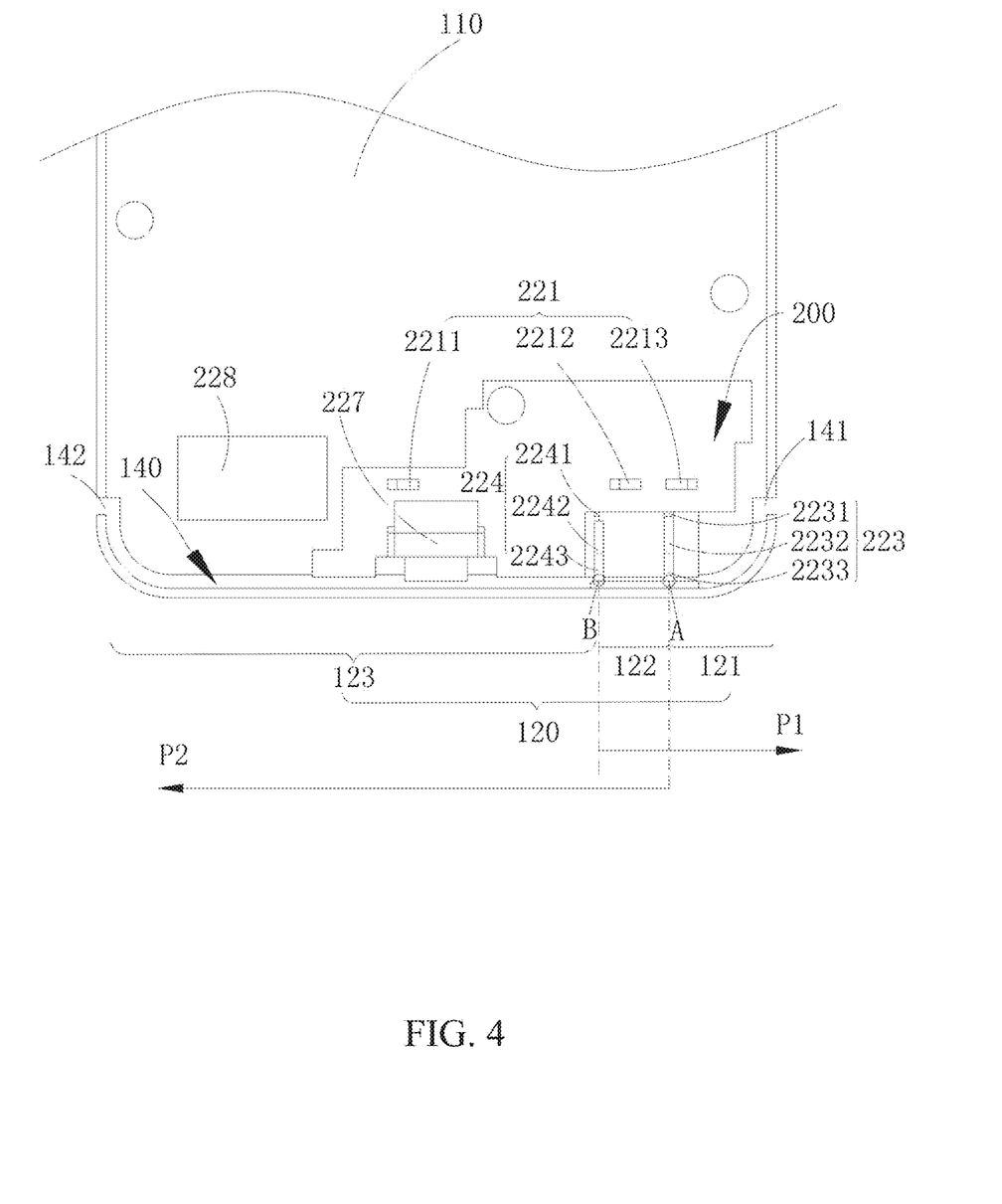
FIG. 4 is a partial structural schematic diagram of the mobile terminal (after removing the system ground) in FIG. 2.

In the present embodiment, as shown in FIG. 4, the first metal frame 120 generally includes a first radiating portion 121, a second radiating portion 122 and a third radiating portion 123 which are successively connected. The first radiating portion 121 generally includes a first arc section (not labeled) and a first straight-line section (not labeled). The second radiating portion 122 is connected with the first straight-line section of the first radiating portion 121, and the second radiating portion 122 is a straight-line section. The third radiating portion 123 includes a second straight-line section (not labeled) which is connected with the second radiating portion 122, and a second arc section (not labeled) which forms an arc transition to the second straight-line section. In the present embodiment, a length of the first radiating portion 121 is smaller than a length of the third radiating portion 123, which is specifically reflected that the length of the first straight-line section is smaller than the length of the second straight-line section. The shape and length of the first arc section is the same with those of the second arc section.

The shape of the second metal frame 130 is the same with that of the first metal frame 120, which will not be repeated herein.

In the present embodiment, optionally, the first metal frame 120 is a bottom frame of the mobile terminal 1000 (such as cellphone, tablet PC and the like), the second metal frame 130 is a top frame of the mobile terminal 1000. Of course, alternatively, the first metal frame 120 can also be used as the top frame, and the second metal frame 130 can also be used as the bottom frame.

Further referring to FIG. 1 in combination with FIG. 4, the first metal frame 120 forms a first gap 140 cooperatively together with the metal cover plate 110. Similarly, the second metal frame 130 forms a second gap 150 cooperatively together with the metal cover plate 110. The first gap 140 includes a first opening 141 and a second opening 142. The first radiating portion 121 is arranged adjacent to the first opening 141, and the third radiating portion 123 is arranged adjacent to the second opening 142.

Further as shown in FIGS. 1-2, optionally, the mobile terminal 1000 further includes a first insulating casing 300 which is fitted on one side of the first metal frame 120 and the metal cover plate 110 and fills the first gap 140; and a second insulating casing 400 which is fitted on the other side of the second metal frame 130 and the metal cover plate 110 and fills the second gap 150. The antenna module 200 is optionally carried on the first insulating casing 300, i.e., the first insulating casing 300 is arranged between the antenna module 200 and the metal cover plate 110 (or the first metal frame 120), so as to reduce the shielding or absorbing effect of the metal cover plate 110 (or the first metal frame 120) to the antenna module 200. In the present embodiment, optionally, the first insulating casing 300 and the second insulating casing 400 are plastic casing. Of course, in other embodiments, the first insulating casing 300 and the second insulating casing 400 can also be made of ceramic, glass and the like.

Figure 3:
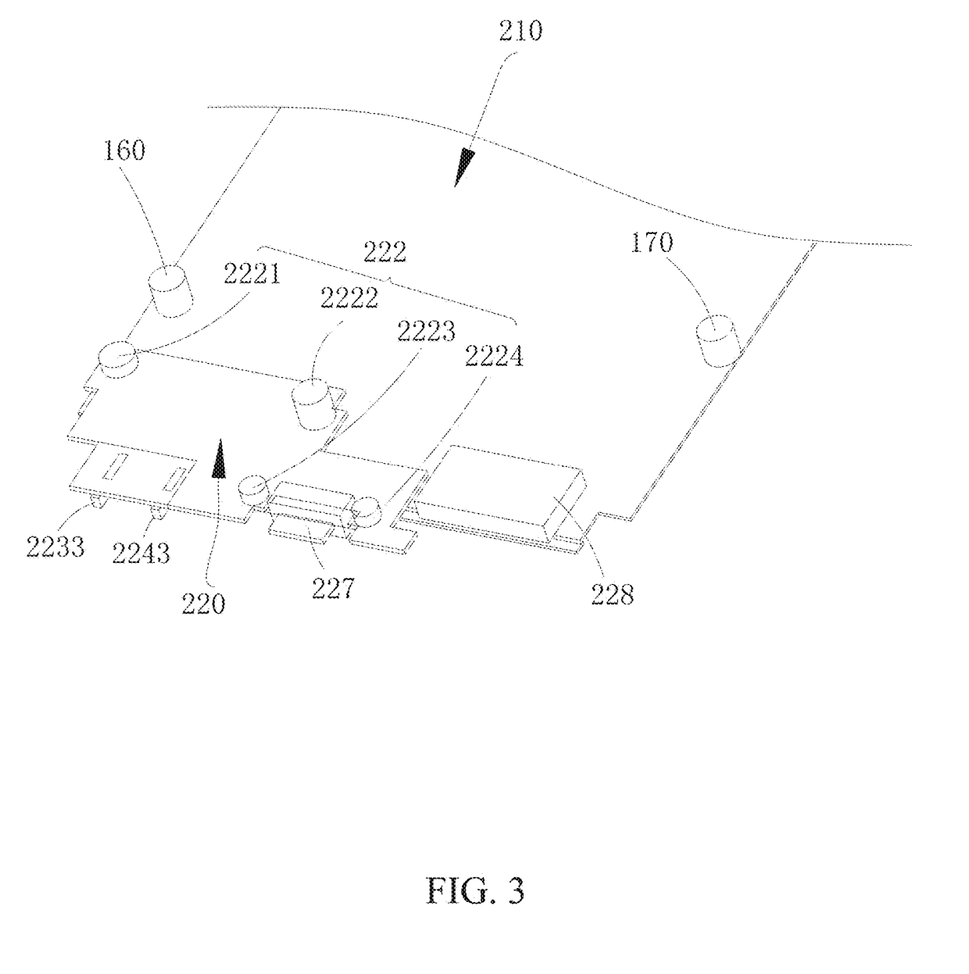
FIG. 3 is a partial structural schematic diagram of an antenna module of the mobile terminal in FIG. 2.

As shown in FIGS. 3-4, in the present embodiment, the antenna module 200 generally includes a system ground 210 electrically connected with the metal cover plate 110, and an antenna circuit board 220 electrically connected with the system ground 210. In the present embodiment, the system ground 210 is provided between the system circuit board (not shown) and the antenna circuit board 220. The system ground 210 is optionally a metal plate, which is also used to provide structural support to the display screen meanwhile being used as the ground plane of the system. The metal cover plate 110 contacts with the system ground 210 through different grounding points provided at different locations, so as to achieve ground connection. For example, in the embodiment shown in FIGS. 3-4, the metal cover plate 110 is connected with the system ground 210 through a first grounding point 160 and a second grounding point 170.

Similarly, the antenna circuit board 220 is also connected with the system ground 210 through at least one grounding pin and/or grounding point. Specifically, the antenna circuit board 220 is provided with a first grounding assembly 221, so as to connect with the system ground 210 through the first grounding assembly 221. As shown in FIG. 4, in the present embodiment, the first grounding assembly 221 can include a first grounding pin 2211, a second grounding pin 2212 and a third grounding pin 2213 which are spaced with each other. Of course, in other embodiments, the number of the grounding pins is not limited to three, and can also be one, two or more than four, as long as the ground connection between the antenna circuit board 220 and the system ground 210 can be achieved.

Moreover, the antenna circuit board 220 is also connected with the metal cover plate 110 through a common second grounding assembly 222. As shown in FIG. 3, in the present embodiment, the second grounding assembly 222 specifically includes four grounding points which are spaced with each other, i.e., a third grounding point 2221, a fourth grounding point 2222, a fifth grounding point 2223 and a sixth grounding point 2224. Both the antenna circuit board 220 and the metal cover plate 110 can be connected with the system ground 210 through these grounding points to achieve ground connection. Of course, in other embodiments, the second grounding assembly 222 can also include other numbers of grounding points, for example one, two, three, or more than five.

Further as shown in FIGS. 3-4, the antenna circuit board 220 further includes a grounding circuit 223, a feeding circuit 224, a tuner 225 electrically connected with the grounding circuit 223, and a tunable matching circuit 226 electrically connected with the feeding circuit 224.

Specifically, the grounding circuit 223 is mounted on a side of the antenna circuit board 220 close to the first metal frame 120, including a seventh grounding point 2231, a fourth grounding pin 2233, and a grounding path 2232 connecting the seventh grounding point 2231 with the fourth grounding pin 2233. The seventh grounding point 2231 is electrically connected with the tuner 225. The fourth grounding pin 2233 goes across the first gap 140 and directly contacts with the first metal frame 120 at a contact point A so as to achieve an electrical connection. In the present embodiment, the contact point A is also a connection point between the first radiating portion 121 of the first metal frame 120 and the second radiating portion 122.

One side of the feeding circuit 224 is electrically connected with the first metal frame 120, the other side thereof is electrically connected with the matching circuit 226, so as to provide feeding to the antenna module 200. As shown in FIGS. 3-4, the feeding circuit 224 generally includes a feeding point 2241, a feeding pin 2243 and a feeding path 2242 connecting the feeding point 2241 and the feeding pin 2243. The antenna module 200 can achieve feeding at the feeding point 2241 by adopting for example a radio frequency cable (RF cable), and the feeding point 2241 is further electrically connected with the matching circuit 226. The feeding pin 2243 goes across the first gap 140 and directly contacts with the first metal frame 120 at a contact point B so as to achieve an electrical connection. In the present embodiment, the contact point B is also a connection point between the second radiating portion 122 and the third radiating portion 123.

It can be seen that, in the present embodiment, the three radiating portions of the first metal frame 120 are actually distinguished by the grounding pins and the feeding pins. Specifically, as shown in FIG. 4, the first radiating portion 121 of the first metal frame 120 extends from the first opening 141 to the contact point A (grounding pin); the second radiating portion 122 extends from the contact point A (grounding pin) to the contact point B (feeding pin); the third radiating portion 123 extends from the contact point B (feeding pin) to the third radiating portion 123 of a second end portion B.

Further, as shown in FIG. 4, the tuner 225 is connected at the seventh grounding point 2231, configured to tune the antenna module 200, in particular, achieve aperture tuning in middle-high frequency bands in the frequency ranges of 1710-2170 MHz and 2300-2690 MHz, so as to optimize the return loss and radiation efficiency of the antenna module, thereby covering more different frequency areas. The tuner 225 is optionally a flexible aperture tuner.

Figure 5:
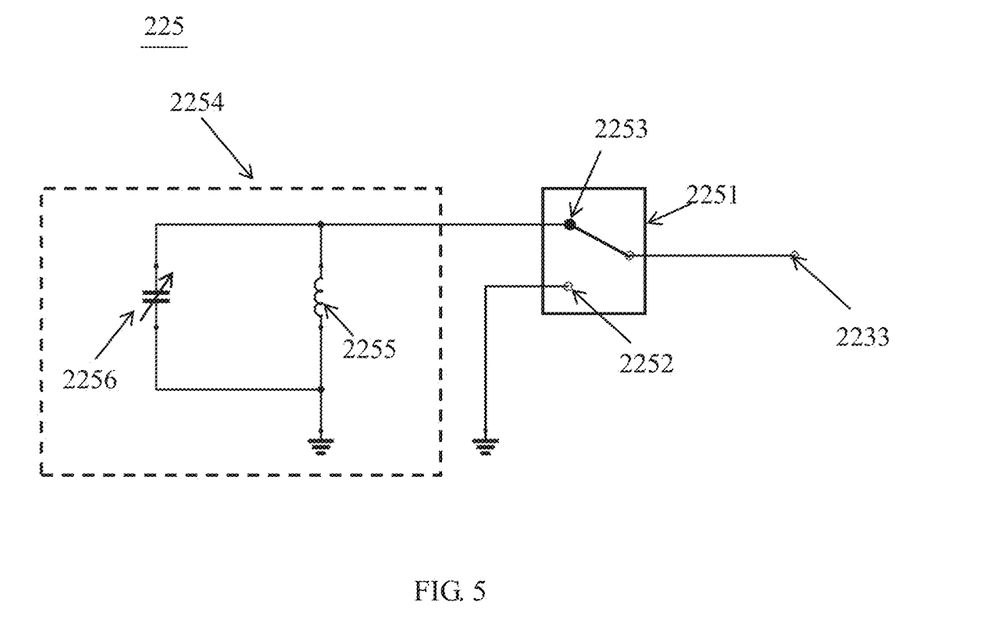
FIG. 5 is an equivalent circuit diagram of a tuning circuit of the mobile terminal.

FIG. 5 shows an equivalent circuit diagram of the tuner 225 according to an embodiment of the present invention. As shown in FIG. 5, the tuner 225 generally includes a radio frequency switch 2251. One end of the radio frequency switch 2251 is connected with the seventh grounding point 2231, the other end can be switched between a first switching point 2252 and a second switching point 2253, so as to electrically connect the fourth grounding point 2233 with ground or with a LC circuit to achieve tuning. In the present embodiment, the first switching point 2252 is connected with ground, the second switching point 2253 is electrically connected with a tunable LC circuit 2254.

Specifically, when the radio frequency switch 2251 is switched to connect with the first switching point 2252, the fourth grounding pin 2233 will be directly connected with ground. When the radio frequency switch 2251 is switched to connect with the second switching point 2253, the fourth grounding pin 2233 is electrically connected with the tunable LC circuit 2254, so as to achieve aperture tuning to the antenna module 200. In the present embodiment, the LC circuit 2254 specifically includes an invariable first inductance 2255 and a variable first capacitance 2256 which are arranged in parallel. Through adjusting capacitance value C1 of the first capacitance 2256, the tuning in middle-high frequency bands of the antenna module 200 can be achieved. The range of the capacitance value C1 of the first capacitance 2256 is optionally 0.3 pF-3.5 pF, further optionally 0.8 pF-3.3 pF.

In the present embodiment, the antenna circuit board 220 further includes a tunable matching circuit 226, so as to achieve impedance matching tuning in low frequency band of the antenna module 200, in particular in the frequency range of 700-960 MHz, so as to further optimize the return loss of the antenna module 200, thereby increasing efficiency of the antenna module 200.

Figure 6:
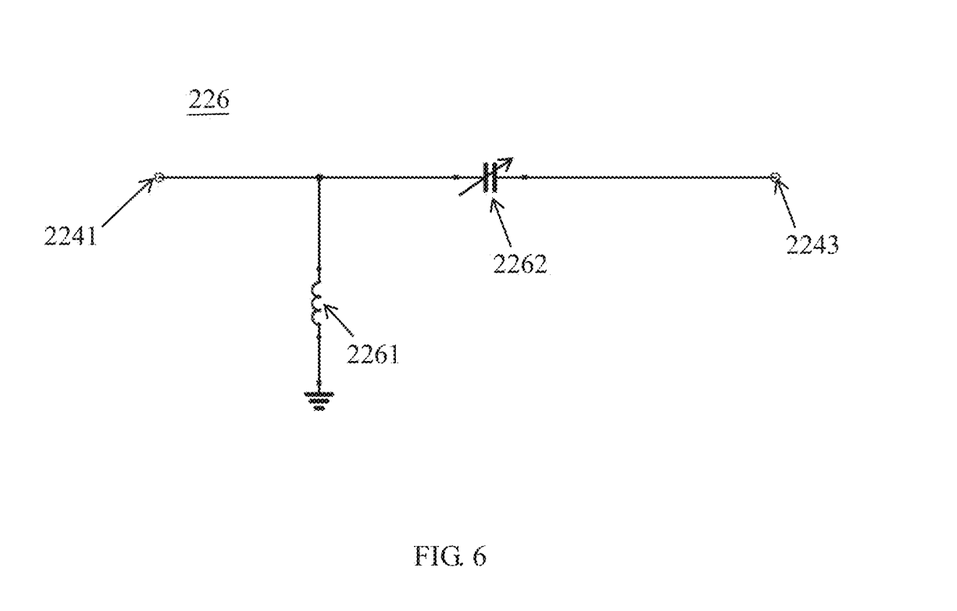
FIG. 6 is an equivalent circuit diagram of a tunable matching circuit of the mobile terminal.

FIG. 6 shows an equivalent circuit diagram of a matching circuit 226 according to an embodiment of the present invention. As shown in FIG. 6, the matching circuit 226 is connected at the feeding point 2241. The matching circuit 226 generally includes an invariable second inductance 2261 and a variable second capacitance 2262 which are arranged in parallel. The second inductance 2261 is connected between the feeding point 2241 and the ground, configured to connect the feeding point 2241 with the ground. The second capacitance 2262 is connected between the feeding point 2241 and the feeding pin 2243, so as to achieve tuning in low frequency band of the antenna module through adjusting the capacitance value C2 of the second capacitance 2262. In the present embodiment, the range of the capacitance value C2 of the second capacitance 2262 is optionally 2.5 pF-10 pF, further optionally 2.7 pF-8 pF.

Moreover, in the present embodiment, the antenna circuit board 220 can further be provided with a USB interface 227 for connecting with external devices, and a speaker 228 to achieve sounding of the mobile terminal 1000. Of course, other electrical devices can also be arranged on the antenna circuit board 220 according to actual demands.

The working principle of the antenna module according to the present invention will be briefly introduced with reference to FIGS. 1-6.

As shown in FIGS. 1-6, the working principle of the antenna module according to the present invention is similar to a PIFA antenna. When tuning in middle-high frequency bands, the first radiating portion 121 and the second radiating portion 122 are adopted as the radiator of the antenna module. At this time, the current flows from the contact point B to a first end portion A along a first direction P1 (referring to the arrow direction of P1 in FIG. 4). At this time, the tuner 225 facilitates the tuning of the antenna module, and makes the resonance shift between the middle-high frequency bands.

When tuning in low frequency band, the second radiating portion 122 and the third radiating portion 123 are adopted as the radiator of the antenna module. At this time, the current flows from the contact point A to the second end portion B along a second direction P2 (referring to the arrow direction of P2 in FIG. 4). At this time, the matching circuit 226 can facilitate the tuning in low frequency band, for example in the frequency range of 700 MHz-960 MHz.

Figure 7:
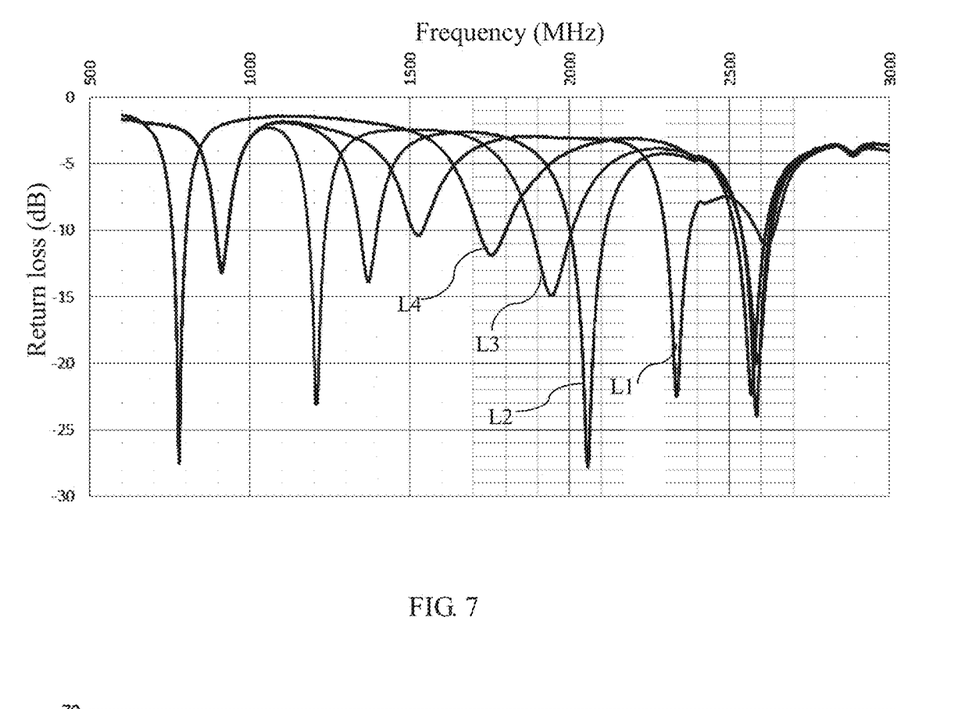
FIG. 7 shows a measurement result of return loss of the mobile terminal when adopting aperture tuning.
Figure 8:
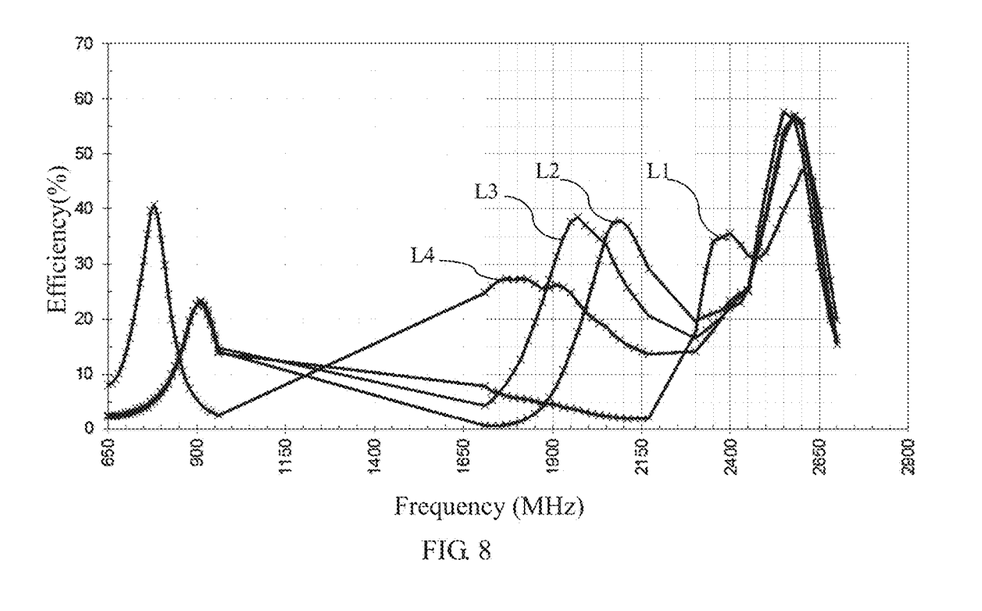
FIG. 8 shows a measurement result of antenna efficiency of the mobile terminal when adopting aperture tuning.

FIGS. 7-8 show the measurement results of the return loss and the efficiency when adopting aperture tuning in the middle-high frequency bands of the antenna module. In the embodiment, the capacitance value C1 of the first capacitance 2256 of the tuner 225 changes, while the capacitance value C2 of the second capacitance 2262 of the matching circuit 226 remains constant. Specifically, as shown in FIGS. 7-8, in the present embodiment, the capacitance value C2 of the second capacitance 2262 remains constant at 2.7 pF. All of curves L1, L2 and L3 represent the measurement results when the radio frequency switch 2251 is switched to the second switching point 2253. The curve L1 is a measurement result when the capacitance value C1 of the first capacitance 2256 is 0.39 pF. The curve L2 is a measurement result when the capacitance value C1 of the first capacitance 2256 is 1.46 pF. The curve L3 is a measurement result when the capacitance value C1 of the first capacitance 2256 is 2.88 pF. Curve L4 represents the measurement result when the radio frequency switch 2251 is switched to the first switching point 2252.

It can be seen from FIGS. 7-8, as the capacitance value C1 of the first capacitance 2256 increases, the resonance shifts from the high frequency band (LTE40 frequency band, the frequency range is 2300-2400 MHz) towards the middle frequency band (including the PCS1900 frequency band with frequency range of 1850-1990 MHz and the WCDMA2100 frequency band with frequency range of 1920-2170 MHz). Further, as shown in FIGS. 7-8, curves L2 and L3 can also increase resonance of the LTE41 frequency band (2500-2700 MHz), while tuning the resonance in the middle frequency band. Referring to curve L4, the resonance in the middle frequency band can shift to cover the DCS1800 frequency band (1710-1880 MHz).

Therefore, through adopting the aperture tuning technique, and through switching the position of the radio frequency switch and changing the capacitance value C1 of the first capacitance 2256 of the tuner 225, tuning in middle-high frequency bands can be achieved, so that the antenna module can at least cover the frequency ranges of 1710-2170 MHz and 2300-2690 MHz, and cover, including but not limited to, the frequency bands of DSC1800, PCS1900, WCDMA2100, LTE2300 and LTE2500.

Figure 9:
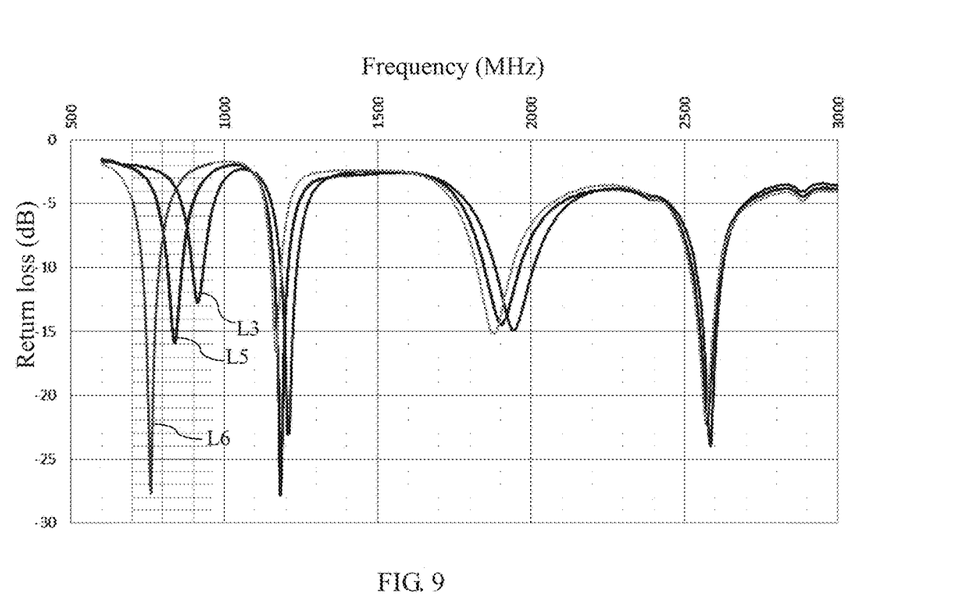
FIG. 9 shows a measurement result of return loss of the mobile terminal when adopting impedance matching tuning.
Figure 10:
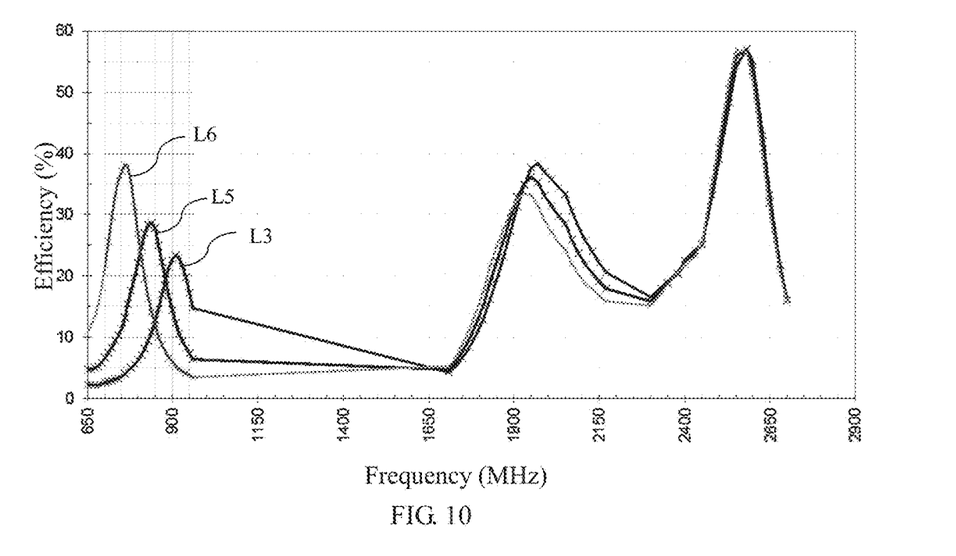
FIG. 10 shows a measurement result of antenna efficiency of the mobile terminal when adopting impedance matching tuning.

FIGS. 9-10 show the measurement results of the return loss and the efficiency of the antenna module when achieving tuning adopting the matching circuit. At this time, the capacitance value C1 of the first capacitance 2256 of the tuner 225 remains constant, while the capacitance value C2 of the second capacitance 2262 of the matching circuit 226 changes. Specifically, as shown in FIGS. 9-10, in the present embodiment, the capacitance value C1 of the first capacitance 2256 of the tuner 225 remains constant at 2.88 pF. The curves L3, L5 and L6 respectively represent measurement results when the capacitance value C2 of the second capacitance 2262 is 2.7 pF, 4 pF and 8 pF.

It can be seen from FIGS. 9-10, when the capacitance value C1 of the first capacitance 2256 of the tuner 225 remains constant, through adjusting the capacitance value C2 of the second capacitance 2262 in the matching circuit 226, tuning in low frequency band can be achieved, so that the antenna module can at least cover the radiating frequency range of 700-960 MHz, and cover, including but not limited to, frequency bands of LTE700 (703-803 MHz), GSM850 (824-894 MHz) and GSM900 (880-960 MHz).

Therefore, through adopting the first metal frame as the radiator of the antenna, and connecting the tuner at the grounding point of the grounding circuit, so that aperture tuning of the antenna module can be achieved. In addition, the present invention further introduces a matching circuit at the feeding point of the feeding circuit, so as to further optimize the performance of the antenna module. The antenna module of the present invention can achieve flexible tuning between multiple frequency bands, and can optimize the return loss and antenna efficiency (radiation efficiency and overall efficiency) of the antenna module under different frequency bands, which significantly eliminates the restriction of the all-metal back cover to the antenna module of the mobile terminal. Therefore, the antenna module of the present invention can guarantee the attractive overall appearance of the mobile terminal while covering relative large signal frequency bands.

It should be noted that, the above are merely embodiments of the present invention, those skilled in the art can make improvements without departing from the inventive concept of the present invention, however, these improvements shall belong to the protection scope of the present invention.

What is claimed is:

1. A mobile terminal, comprising:
    a metal back cover including a metal cover plate, a first metal frame and a second metal frame respectively arranged at and keeping a distance from two opposite sides of the metal cover plate for forming a first gap, the first metal frame comprising a first radiating portion, a second radiating portion and a third radiating portion successively connected;
    an antenna module fixed on a side of the metal back cover close to the first metal frame, the antenna module comprising a system ground electrically connected with the metal cover plate, and an antenna circuit board electrically connected with the system ground and the first metal frame, respectively, the antenna circuit board including a grounding circuit, a feeding circuit, a tuner and a matching circuit; wherein
    the grounding circuit comprises a grounding point electrically connected with the tuner and a grounding pin electrically connected with the grounding point and going across the first gap for directly contacting with the first metal frame;
    the feeding circuit comprises a feeding point electrically connected with the matching circuit and a feeding pin electrically connected with the feeding point and going across the first gap for directly contacting with the first metal frame; and
    the first, second and third radiating portions are such configured that when tuning in middle-high frequency bands, the first radiating portion and the second radiating portion serve as a radiator of the antenna module, and when tuning in a low frequency band, the second radiating portion and the third radiating portion serve as a radiator of the antenna module.

2. The mobile terminal as described in claim 1, wherein, the first gap comprises a first opening and a second opening; the first radiating portion extends from the first opening to the grounding pin; the second radiating portion extends from the grounding pin to the feeding pin; and the third radiating portion extends from the feeding pin to the second opening.

3. The mobile terminal as described in claim 2, wherein, a length of the first radiating portion is smaller than a length of the third radiating portion.

4. The mobile terminal as described in claim 1, wherein, the tuner comprises a radio frequency switch having one end thereof electrically connected with the grounding point, and another end switching between a first switching point connected with ground and a second switching point electrically connected with a tunable LC circuit.

5. The mobile terminal as described in claim 4, wherein, the tunable LC circuit comprises an invariable first inductance and a variable first capacitance which are arranged in parallel.

6. The mobile terminal as described in claim 5, wherein, a capacitance value range of the first capacitance is 0.3 pF-3.5 pF.

7. The mobile terminal as described in claim 1, wherein, the matching circuit comprises an invariable second inductance which is electrically connected with the feeding point and is connected with ground, and a variable second capacitance which is connected between the feeding point and the feeding pin; the second inductance and the second capacitance are arranged in parallel.

8. The mobile terminal as described in claim 7, wherein, a capacitance value range of the second capacitance is 2.5 pF-10 pF.

9. The mobile terminal as described in claim 1, wherein, the antenna circuit board is connected with the system ground through at least one grounding pin and/or grounding point for achieving a ground connection.

10. The mobile terminal as described in claim 1, further including a second gap formed between the second metal frame and the metal cover plate, a first insulating casing attached to the first metal frame and the metal cover plate for filling the first gap, and a second insulating casing attached to the second metal frame and the metal cover plate for filling the second gap.

* * * * *